(12) United States Patent
Herndon

(10) Patent No.: US 8,408,626 B1
(45) Date of Patent: Apr. 2, 2013

(54) AERODYNAMIC STOWABLE TRUCK BED EXTENDER

(76) Inventor: Brett Stuart Herndon, Little Rock, AR (US)

( * ) Notice: Subject to any disclaimer, the term of this patent is extended or adjusted under 35 U.S.C. 154(b) by 0 days.

(21) Appl. No.: 13/396,264

(22) Filed: Feb. 14, 2012

(51) Int. Cl.
*B60R 21/02* (2006.01)

(52) U.S. Cl. ............... 296/26.11; 296/57.1; 296/26.08; 296/180.1

(58) Field of Classification Search ............ 296/26.08, 296/26.11, 26.09, 26.1, 180.1, 180.2, 57.1
See application file for complete search history.

(56) References Cited

U.S. PATENT DOCUMENTS

| | | | | |
|---|---|---|---|---|
| 4,496,184 A | * | 1/1985 | Byrd et al. ............... | 296/100.15 |
| 7,226,100 B1 | * | 6/2007 | Willey et al. ............. | 296/26.11 |
| 7,954,881 B2 | * | 6/2011 | Berg ....................... | 296/180.1 |
| 2008/0303304 A1 | * | 12/2008 | Jaskolski ................. | 296/57.1 |
| 2011/0204672 A1 | * | 8/2011 | Herndon ................. | 296/100.06 |

* cited by examiner

*Primary Examiner* — Joseph Pape
*Assistant Examiner* — Dana Ivey

(57) ABSTRACT

An aerodynamic stowable bed extender for pickup trucks meant to be mounted upon the lowered tailgate of the truck bed and utilized in conjunction with either an aerodynamic truck bed cap or tonneau cover. The aerodynamic bed extender is positioned in either a deployed configuration, upon the lowered tailgate, or a stowed configuration within the bed of the pickup truck. Deployed, the bed extender increases the fuel efficiency of the truck while also increasing usable cargo space within the truck bed. The aerodynamic bed extender comprises a cover and two side panels. The cover can be raised to an open position allowing access to the truck bed or detached from the side panels and stowed within the truck bed. The side panels can be repositioned from a deployed position to a stowed position within the bed of the pickup truck.

12 Claims, 5 Drawing Sheets

AERODYNAMIC STOWABLE TRUCK BED EXTENDER

BACKGROUND OF THE INVENTION

1. Field of the Invention

This invention relates generally to truck caps and cover assemblies for pickup trucks. More particularly, this invention relates to an aerodynamic cover assembly for pickup truck beds that is mounted upon the lowered, open tailgate of a pickup truck bed. The device is stored within the truck bed, when not in use, and then user-deployed and disposed upon the top surface of the lowered tailgate. Known prior art relevant to this invention can be found in U.S. Patent Class 296 subclass 180.1 and 26.11.

2. Description of Prior Art

For several years pickup truck bed extenders of various forms have been utilized upon the open tailgate of the cargo beds of pickup trucks. Bed extenders exist in a variety of forms all providing an expanded volume to usable space within the cargo bed of the pickup truck. Prior art bed extenders provide a greater volume of usable cargo space within the cargo bed by extending the usable space rearward to include the space on top of the open tailgate of the cargo bed. Many different designs and styles of pickup truck bed extenders exist.

In more recent years, aerodynamic truck caps which cover the beds of pickup trucks have been developed designed to increase the fuel efficiency of the pickup truck. Tonneau covers, a generally flat cover for the beds of pickup trucks have also been shown to increase the fuel efficiency of the pickup truck upon which it is utilized.

However, for purposes of further streamlining and reducing the aerodynamic drag of the pickup truck while also expanding the usable cargo volume within the cargo bed, this new aerodynamic stowable truck bed extender has been developed to be utilized upon the lowered, open tailgate of a pickup truck bed. This new aerodynamic stowable truck bed extender is designed to be used in conjunction with either one of the two aforementioned aftermarket products which mount over the open pickup truck cargo bed, the tonneau cover or the aerodynamic truck cap.

U.S. Pat. No. 7,954,881 to Berg (2011) shows an apparatus which is mounted on top of a pickup truck bed and extends rearward to the end of the open tailgate. U.S. Pat. No. 7,413,231 to Wood (2008) shows a stowable, deployable cargo space expansion system that is stowed within the bed of the pickup truck when not in use and then located upon the top surface of the open tailgate when deployed.

U.S. Pat. No. 7,954,881 to Berg provides an aerodynamic truck cap which has a front surface with two opposing sides and a roof. The roof of the Berg patent begins flush with the roof of the truck cab and then slopes rearward to a termination point at the rear opening of the tailgate at a height approximate to that of the floor of the pickup truck bed. In one embodiment of the Berg patent, the roof extends aftward to the rearward end of the lowered tailgate of the pickup truck bed and contacts the top surface of the open tailgate at a height equal to the height of the floor of the cargo bed. The aerodynamic truck cap in the Berg patent has partial side walls which are mounted on the top of the truck bed side walls for only the forward half of the truck bed. The rearward half of the Berg patent aerodynamic cap is void of side walls with the sloped roof continuing rearward and being consistently lower in height than the height of the truck bed side walls until ending at a point at the aft end of the tailgate, which is only as high as the floor of the pickup truck bed. Due to the fact that the aerodynamic cap in the Berg patent is only greater in height than the top of the side walls of the truck bed for only one half the length of the truck bed, the interior covered space it provides is greatly reduced in comparison to an aerodynamic truck cap that is greater in height that the side walls of the truck bed for the entire length. Similarly, the rearward portion of the Berg patent, which is disposed upon a lowered tailgate, provides for very marginal usable covered cargo space due to the fact it slopes to an end point at the rear of the lowered tailgate which is only as high as the floor of the pickup truck bed. If the end point of the tailgate mounted apparatus was higher, i.e. the same height as the top of the side walls of the truck bed, the Berg patent would afford many more square feet of usable covered cargo space. Furthermore, it would not be possible to utilize the open tailgate supported aft portion of the Berg patent in conjunction with a tonneau cover or aerodynamic truck cap which are disposed on top of the sidewalls of a truck bed for the entire length of the truck bed. In addition, the tailgate mounted portion of the Berg patent cannot be broken down into separate components which allows for storage inside the truck bed of the apparatus in a space conserving manner, when not in use. Still further, access to the truck bed is very constricted by utilization of the aft tailgate mounted portion of the Berg patent and the pickup truck cannot be operated with the tailgate in a closed, upright position in this specific embodiment of the Berg patent.

U.S. Pat. No. 7,413,231 to Wood, McGuirk and Lopez provides a truck cargo bed management system. The system is deployed upon the upper surface of the open tailgate to extend the usable cargo stowage and hauling capacity of the truck bed. The bed extension components of the Wood patent include two side walls and a main panel. The two side walls are positioned opposed to each other on the right and left sides of the lowered tailgate while disposed in a deployed position. The side panels are attached to the interior side walls of the truck bed by slotted tracks allowing for the user being able to slide the two side panels on the open tailgate forward to a stowed position along the interior side walls of the truck bed. A main back panel is provided in the Wood patent and can be selectively positioned vertically at several locations within the floor of the truck bed to best contain cargo of varying sizes. The main back panel may also be attached to the two sliding side walls, when they are slid rearward and deployed on top of the open tailgate, at a point even with the rearward end of the lowered tailgate. This assembly of the main back panel and side walls allows for the retention of cargo, which is situated upon the open tailgate, while being transported in the bed of the pickup truck. The truck cargo bed management system of the Wood patent does not provide for a roof or cover to protect cargo transported in the pickup truck bed from the elements of weather and aerodynamic forces exerted upon the cargo in the bed at freeway speed. Further, the Wood patent does not allow for a covered space for human habitation. Additionally, when adhering to aerodynamic principles, there is no reduction in aerodynamic drag to increase the fuel efficiency of the host pickup truck gained by utilizing the side walls and main panel assembly of the Wood patent upon the open tailgate of the truck bed. It is highly probable the aerodynamic drag of a pickup truck would be increased with the Wood patent assembly deployed upon the open tailgate thereby reducing the fuel efficiency of the pickup truck. In conclusion, I am aware of no aerodynamic drag reducing pickup truck cargo bed extending combination that, when deployed, is situated upon the interior surface of an open tailgate and would allow for the transportation of cargo approximate in height to that of the top surface of the truck bed therefore maximizing utilizable cargo space. Additionally, I am aware of no aerodynamic drag reducing truck bed extender combination that is meant to be used on top of the open surface of a truck bed and open tailgate that allows for maximum space for human habitation. Ideally, such a drag reducing cargo space enhancing extender meant to be positioned on the interior surface of an open tailgate should provide for a roof that protects cargo from the elements of weather and from aerodynamic forces the cargo is subjected to when the pickup truck is traveling at a high rate of speed. Furthermore, I am aware of no such analogous wind drag reducing covered bed extender that is quickly foldable to a stored position, when not in use, and that is approximate in height to that of the top surface of the pickup truck bed therefore maximizing cargo storage space and inhabitable space for humans or domestic animals.

BRIEF SUMMARY OF THE INVENTION

The invention, an improved aerodynamic stowable truck bed extender that is designed to be utilized in conjunction with an aerodynamic truck cap or tonneau cover. The new aerodynamic bed extender is mounted upon the open, lowered tailgate of a pickup truck and provides an extension to the usable cargo bed space while also providing a greater reduction in aerodynamic drag of the pickup truck which improves fuel efficiency. The new aerodynamic bed extender has two opposed pivoting sides which can be folded forward, from a deployed position over the open tailgate, to a stowed position within the bed of the pickup truck. A roof, hingedly connected to a back panel, is detachably connectable to the two deployed sides creating an enclosure over the open, lowered tailgate or can be removed and stowed within the truck bed when not in use.

Accordingly a functional object of the invention is to provide an improved aerodynamic bed extender to be used in conjunction with a tonneau cover or aerodynamic truck cap to lower wind resistance and enhance the fuel efficiency of the host pickup truck.

Another basic object is to provide a greater space for the transportation of cargo and for human habitation.

It is also an object to allow operation of the host pickup truck while in motion with the aerodynamic bed extender in a deployed configuration disposed on top of the open tailgate.

Further, an important object is to provide a tailgate mounted aerodynamic bed extender of the character described with durable structure able to withstand aerodynamic forces exerted upon the device while the pickup truck is traveling at a high rate of speed.

Another object is to provide a tailgate mounted aerodynamic bed extender of the character described that can be quickly transformed between a stowed configuration and a deployed configuration.

Still further objects and advantages will become apparent from a study of the following description and the accompanying drawings.

BRIEF DESCRIPTION OF THE SEVERAL VIEWS OF THE DRAWINGS

In the following drawings, which form part of the specification and which are to be construed in conjunction therewith, and in which like reference numerals have been employed throughout where ever possible to indicate like parts in the various views.

DETAILED DESCRIPTION OF THE INVENTION

Figure 1:
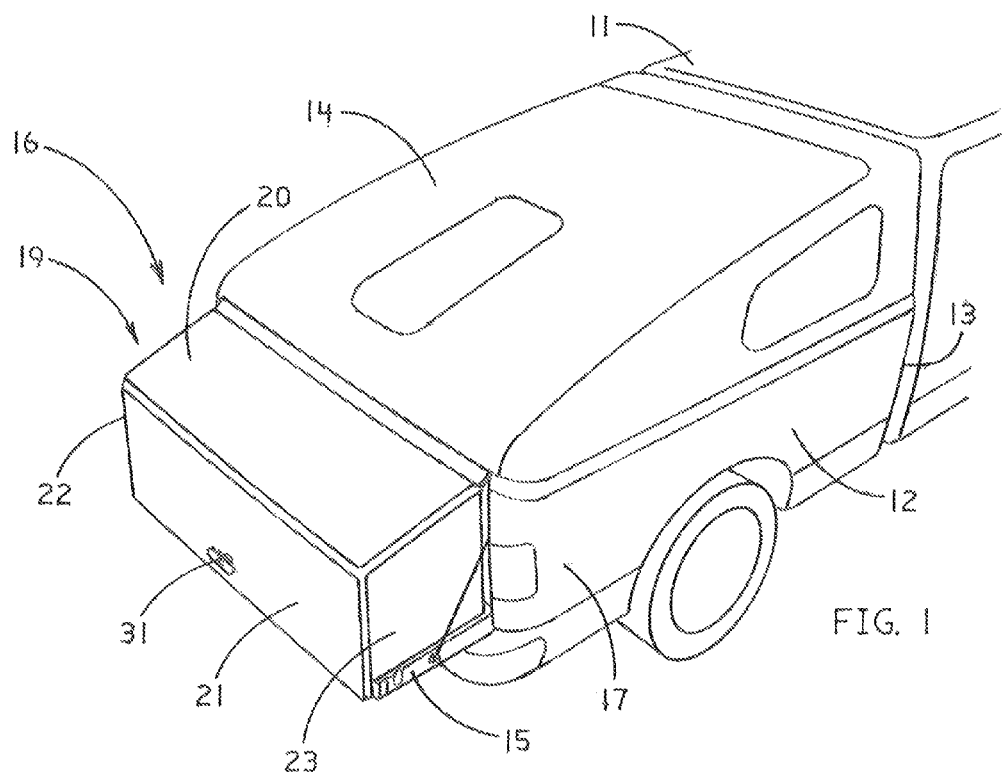
FIG. 1 is a fragmentary perspective view showing my aerodynamic stowable bed extender disposed in a deployed position mounted upon the open tailgate of a pickup truck bed in conjunction with an aerodynamic truck cap mounted upon the bed of the pickup truck in accordance with the best mode of the invention.
Figure 2:
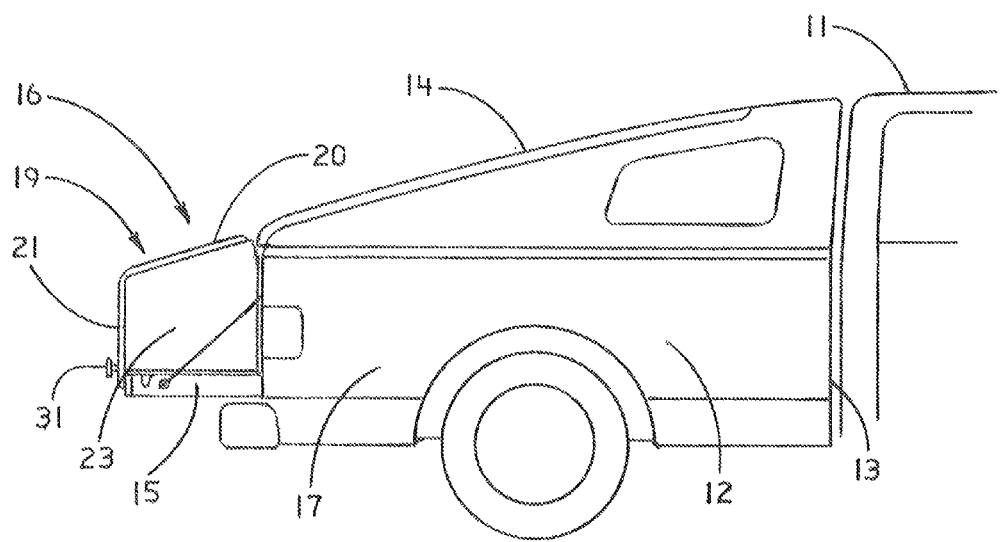
FIG. 2 is a fragmentary right side elevation view of the aerodynamic stowable bed extender for a pickup truck disposed in a deployed position in conjunction with an aerodynamic truck cap.
Figure 9:
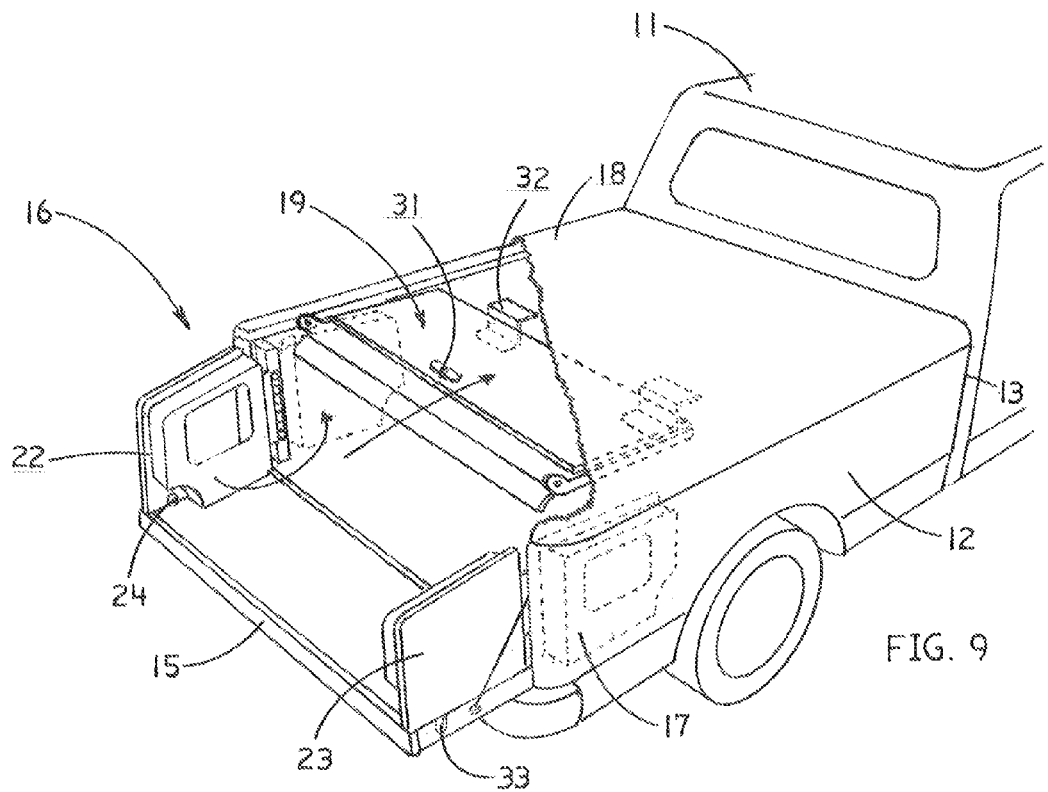
FIG. 9 is a fragmentary perspective view with cut-away sections, similar to FIG. 7, showing the sides of the aerodynamic bed extender deployed on top of the open tailgate and the roof and back panel of the aerodynamic bed extender removed and stowed underneath a tonneau cover which is mounted upon the bed of the pickup truck.

With initial reference directed to FIGS. 1 and 2 of the appended drawings, a conventional pickup truck having a cab 11, a conventional rear truck bed 12, behind the cab 11, with an aerodynamic truck cap 14 or tonneau cover 18 (FIGS. 3 and 4) installed upon the truck bed 12. The truck bed 12 is defined by an upstanding front panel 13, opposite cab 11, truck bed side walls 17 and a tailgate 15. My new aerodynamic stowable bed extender for pickup trucks, constructed generally in accordance with the best mode of the invention, has been generally designated by the reference numeral 16. Aerodynamic bed extender 16 preferably comprises an aerodynamically configured, cover assembly 19, comprising a roof 20, a back panel 21, and a left side panel 22 and right side panel 23. The substantially rigid, preferably fiberglass or thermo-formable plastic, bed extender 16 is disposed upon the lowered, open tailgate 15 of the pickup truck in the best mode of the invention. The left side wall 22 and the right side wall 23 are pivotally attached to the truck bed side walls 17 and are operationally associated with the truck bed 12. The cover assembly 19 is mounted upon and overlie side panels 22 and 23 with the roof 20 positioned on top surfaces of the side panels 22 and 23, then sloping rearward from a position closest to the truck bed 12 to a point proximate the aft end of the open tailgate 15. Back panel 21 is disposed overlying the vertical rearward edges of side panels 22, 23 in an upright orientation and along with the roof 20, create an enclosure upon the lowered tailgate 15. Extender 16 remains open to the interior cargo space of the truck bed 12 thereby increasing the square footage of usable covered cargo space and space for human habitation. The aerodynamic stowable bed extender 16 may be disposed in a deployed, assembled configuration (FIGS. 1, 2, 3 and 4) upon the open tailgate, or stowed inside the truck bed 12, in an unassembled configuration when not in use (FIGS. 7 and 9). Access to the truck bed 12 can be facilitated by raising the cover assembly 19 to a raised, open position (FIGS. 5 and 6) in which the roof 20 and back panel 21 are raised in unison due to a hinged attachment between the two components. Cover assembly 19 is semi-permanently, pivotally attached to the side panels 22 and 23 and can be quickly detached from the deployed position upon side panels 22 and 23 and then relocated to a stowed position within the truck bed 12 as explained herein.

FIGS. 1 and 2 illustrate the aerodynamic bed extender 16 disposed upon a lowered, open tailgate 15 in conjunction with an aerodynamic truck cap 14, mounted upon truck bed 12, with the cover assembly 19 and side panels 22 and 23 shown in a deployed, aerodynamic configuration to allow for fuel efficient travel and to provide a covered space for the secure transportation of cargo. Cover assembly 19 overlies side panels 22 and 23 with back panel 21 being detachably connectable via handle 31 to side panels 22 and 23 at the lower interior, rearward edges, proximate the aft end of the lowered tailgate.

Figure 3:
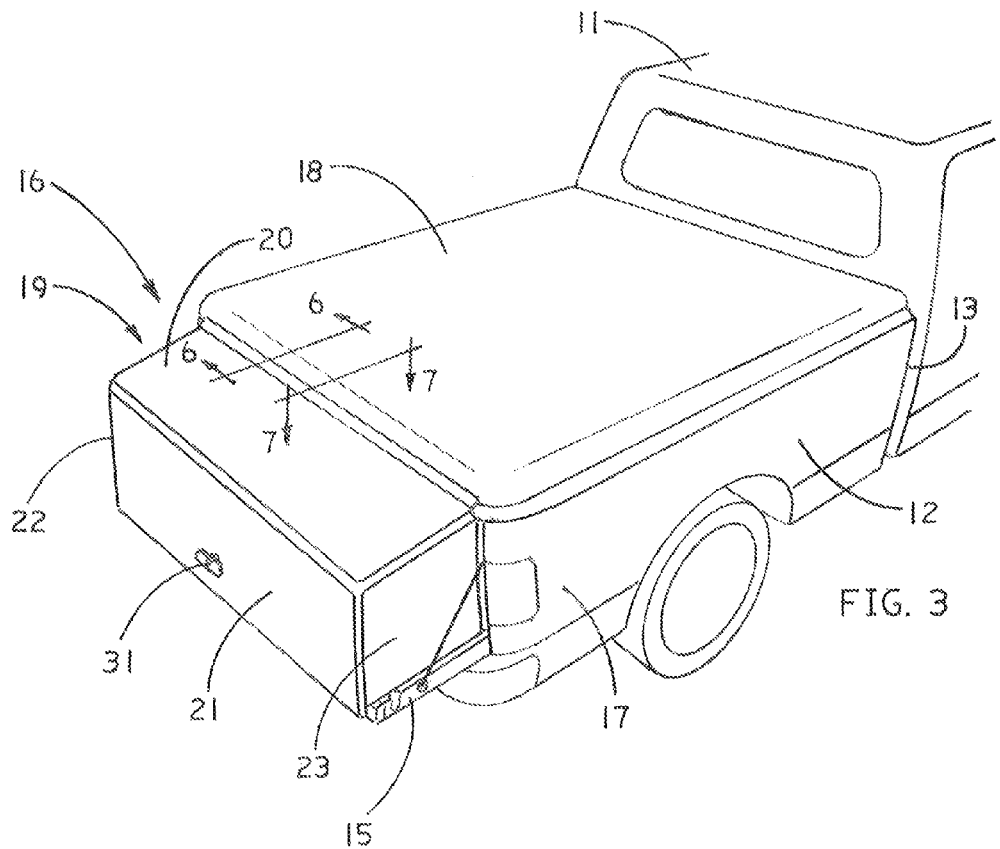
FIG. 3 is a fragmentary perspective view, similar to FIG. 1, illustrating the aerodynamic bed extender mounted upon the open tailgate of a pickup truck bed in conjunction with a tonneau cover mounted upon the bed of the pickup truck.
Figure 4:
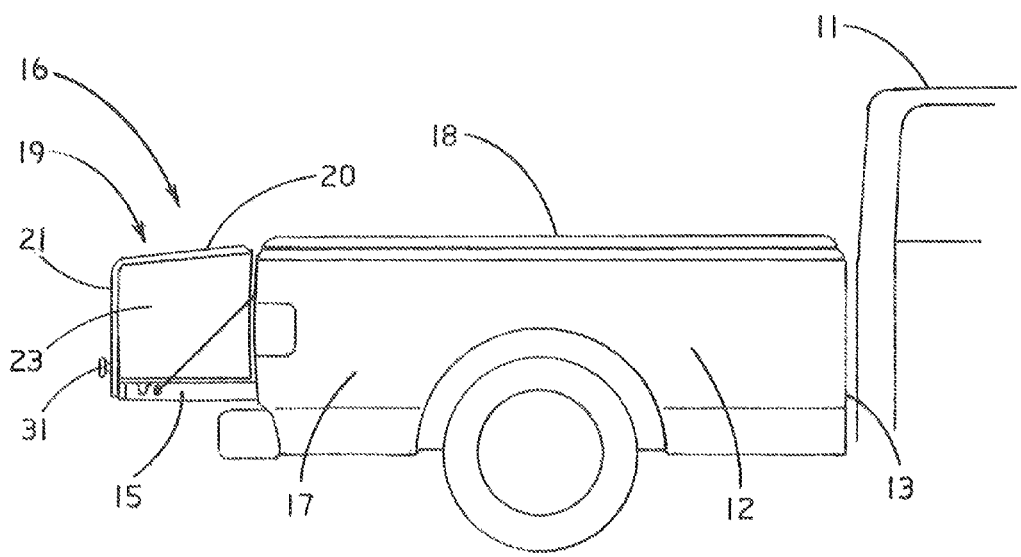
FIG. 4 is a fragmentary right side elevation view, similar to FIG. 2, with the aerodynamic stowable bed extender disposed in a deployed position in conjunction with a tonneau cover.

In FIGS. 3 and 4 the aerodynamic bed extender 16 is disposed upon an open tailgate 15 in conjunction with a conventional tonneau cover 18 which is mounted upon the truck bed 12 of a conventional pickup truck. The bed extender 16 is shown in a deployed aerodynamic configuration with the side panels 22 and 23 positioned upon the lowered tailgate 15 and the cover assembly 19 disposed in a lowered, closed position.

Figure 5:
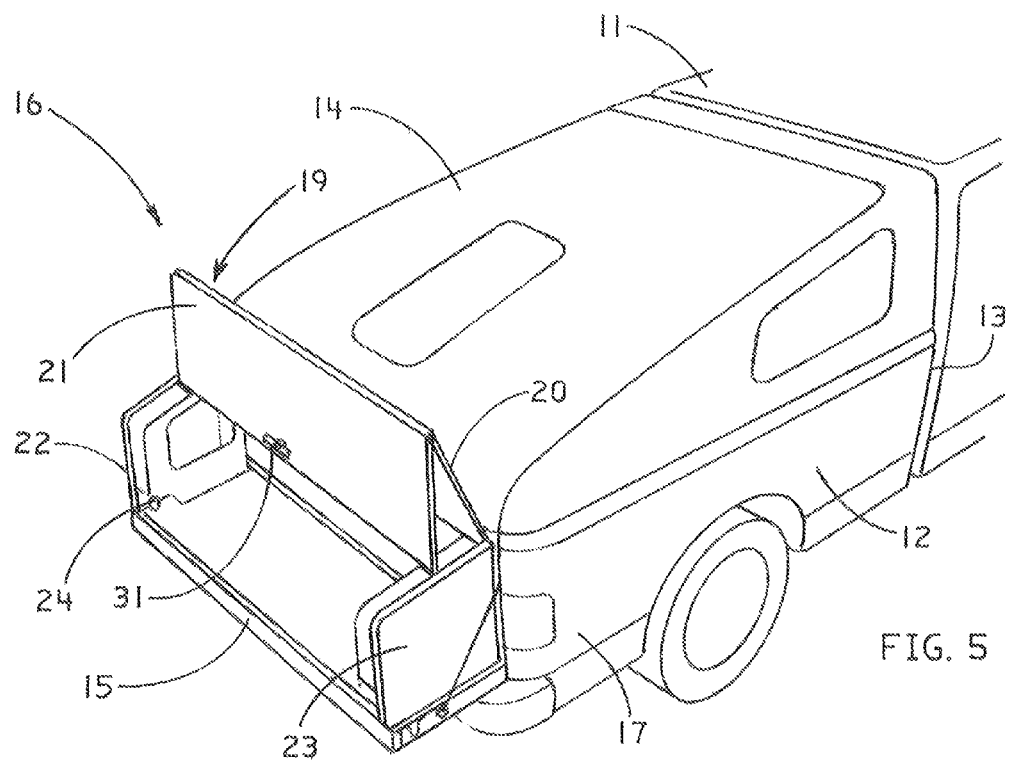
FIG. 5 is a fragmentary perspective view, similar to FIG. 1, with the roof and back panel assembly of the aerodynamic bed extender shown in a raised, open position.
Figure 6:
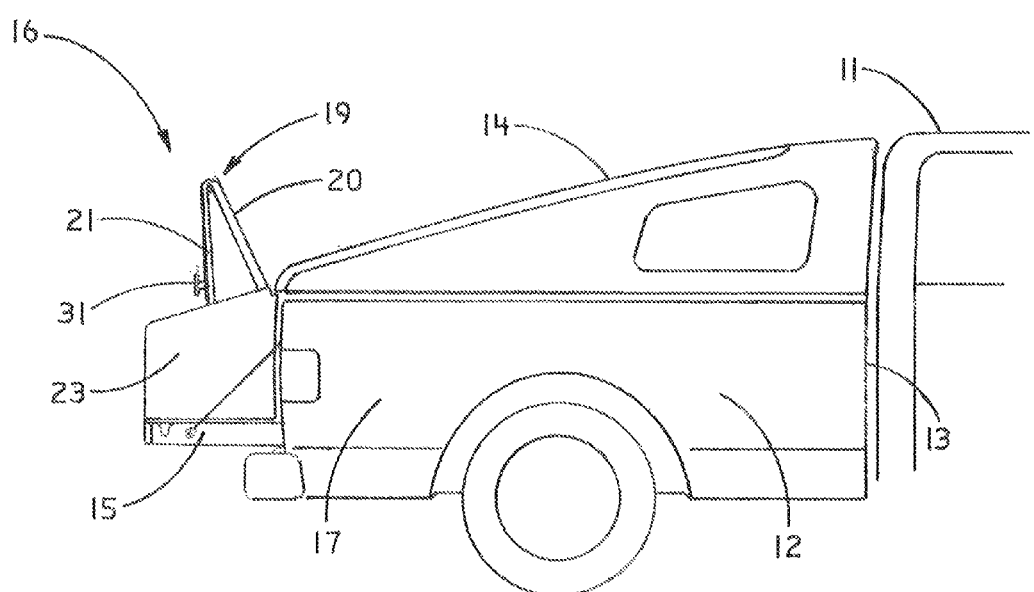
FIG. 6 is a fragmentary right side elevation view, similar to FIG. 2, with the roof and back panel of the aerodynamic stowable bed extender illustrated in an open, raised position.
Figure 7:
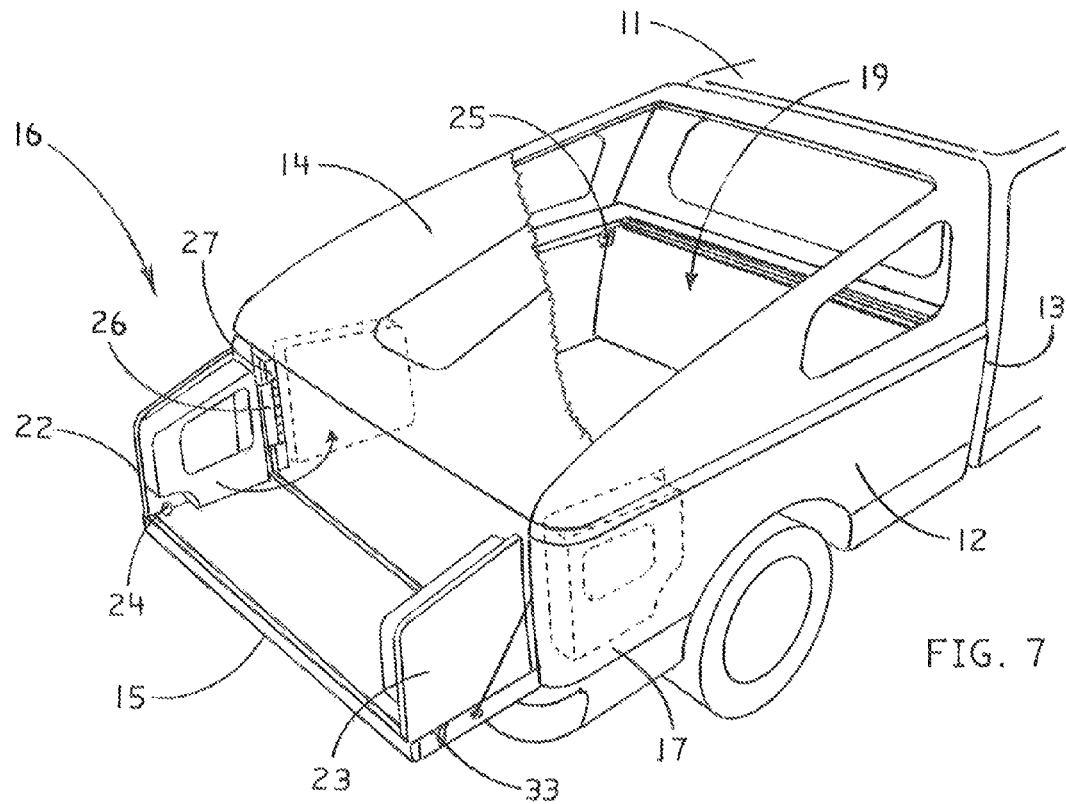
FIG. 7 is a fragmentary perspective view with cut-away sections showing the sides of the aerodynamic bed extender in a deployed position, disposed on top of the open tailgate, with the roof and back panel assembly removed and stowed within the pickup truck bed along the forward wall of the truck bed.

In FIGS. 5 and 6 the aerodynamic bed extender 16 is illustrated disposed upon the open tailgate 15 in conjunction with an aerodynamic truck cap 14 installed over the truck bed 12. The cover assembly 19 is shown in a raised, open position to allow for easy access to the cargo space of the truck bed 12. Back panel 21 is disengaged from side panels 22 and 23 by rotating handle 31. The roof 20 and back panel 21 are raised simultaneously from their closed position overlying side panels 22 and 23 due to being hingedly attached. The roof 20 remains pivotally connected to the forward interior upper corners of side panels 22 and 23 and is raised along with the back panel 21 to a fully open position. The lower edge of the back panel 21 finally situated within two slots on the upper inside edges of side panels 22 and 23 to locate and secure the cover assembly 19 in a fully open position. The interior of the truck bed 12 is accessible for the loading and unloading of cargo with the cover assembly 19 disposed in a fully open position.

In FIG. 7, the aerodynamic truck bed extender 16 is illustrated in conjunction with an aerodynamic truck cap 14, mounted upon the truck bed 12, with the bed extender 16 shown in a partially stowed position. The cover assembly 19 is removed from a position in which it was disposed overlying side panels 22 and 23 which are located in a deployed position on top of the open tailgate 15. Cover assembly 19 has been relocated to a stowed position situated along the forward interior wall of the truck bed 12, adjacent to the upstanding front panel 13 of the truck bed 12. The cover assembly 19 is stowed positioned in an upright orientation being held in place by a detachably connectable means to latch 25 located on the interior of the upper forward portions of the truck bed side walls 17 proximate to the upstanding front panel 13 of the truck bed 12. The side panels 22 and 23 are secured in the fully deployed position on top of the open tailgate 15 by engaging sliding latch 24, located at the lower aft interior corners of side panels 22 and 23, to the factory tailgate rotary latches 33, positioned at the rearward end and along the opposed outboard sides of the tailgate 15. Broken line silhouette outlines illustrate the position of side panels 22 and 23 when disposed in a closed, stowed position within the interior of truck bed 12. Both the left side panel 22 and right side panel 23 may be rotated forward, from a deployed position on top of the tailgate, to a stowed position along the interior of the opposed side walls 17 of the truck bed 12, due to a hinged connection means to the truck bed side walls 17. Most aerodynamic truck caps 14 have a top which can be raised which will allow easy access to the cover assembly 19 stowed against the forward interior wall of the truck bed 12.

Figure 8:
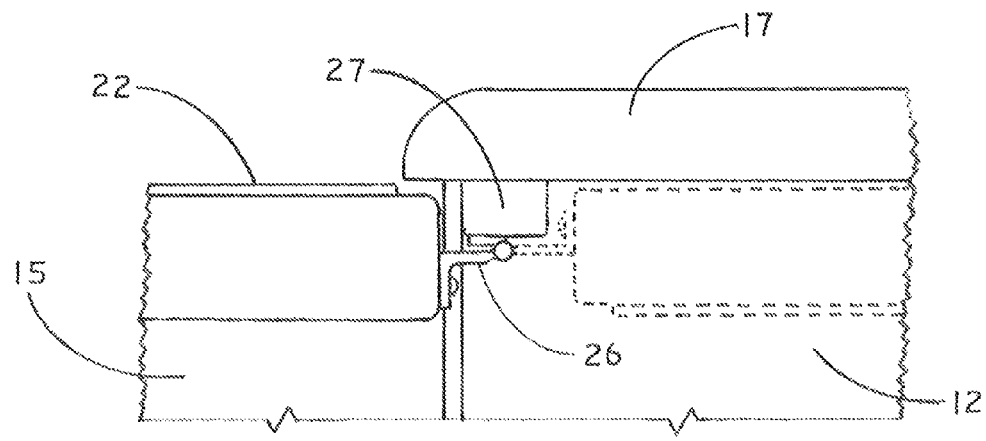
FIG. 8 is a fragmentary partial cross sectional view along line 6-6 of FIG. 3, showing interrelationships of the left side of the truck bed side, tailgate and left side of the aerodynamic stowable bed extender in the deployed position.

FIG. 8 illustrates the interrelationships of the components of the hinged connection of the side panels 22 and 23 to the opposed truck bed side walls 17 (FIG. 8 is a left side cross-sectional view along line 6-6 of FIG. 3 provided with the understanding that the right side view is a mirror image of the left side view). Side panel 22 is pivotally connected to tailgate stop pillar 27 by hinge 26, located vertically along the rearward interior ends of the truck bed side wall 17, (FIG. 7). Sliding latch 24 can be disengaged from the tailgate rotary latch 33 (FIG. 7) allowing the side panel 22 to be rotated forward and inboard, from a deployed position on top of the open tailgate 15, rotating about the axis of hinge 26 to a stowed position, indicated by the broken line silhouette outline, located inside the truck bed 12, disposed along the interior rearward end of the truck bed side wall 17.

In FIG. 9, the aerodynamic truck bed extender 16 is illustrated in conjunction with a tonneau cover 18 mounted upon the truck bed 12, with the bed extender 16 shown in a partially stowed position. The cover assembly 19 is removed from a position in which it was disposed overlying deployed side panels 22 and 23 located on top of the open tailgate 15. Cover assembly 19 has been relocated to a stowed position located along the interior underside of tonneau cover 18 at the rearward end of the tonneau cover 18. The forward edge of cover assembly 19 is held in place by hanger brackets 32 located on the underneath surface of the tonneau cover 18.

Figure 10:
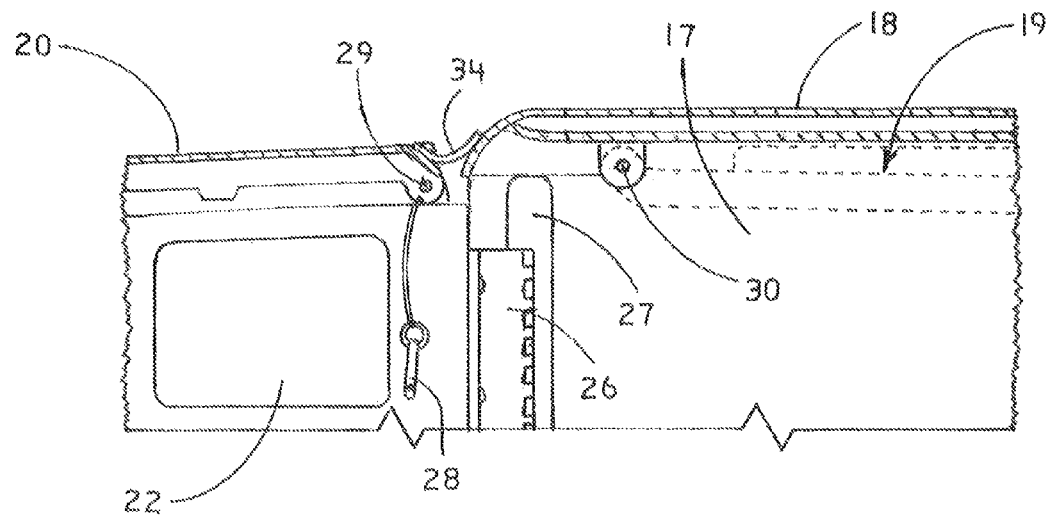
FIG. 10 is a fragmentary partial cross sectional view along line 7-7 of FIG. 3, showing interrelationships of the tonneau cover, truck bed and the aerodynamic stowable truck bed extender and further illustrating keeper brackets to secure the roof and back panel assembly utilized when the aerodynamic bed extender is disposed in either a deployed position or in a stowed position on the underside of the tonneau cover.

FIG. 10 shows the interrelationships of the components of the detachably connectable means of the roof 20, of cover assembly 19, to the side panel 22 and the tonneau cover 18 (FIG. 10 is a left side cross-sectional view along line 7-7 of FIG. 3 provided with the understanding that the right side view is a mirror image of the left side view). The roof 20 of cover assembly 19 is detachably connectable to side wall 22 via hitch pin 28. Hitch pin 28 is inserted through tubed keeper 29, which has an inside diameter slightly greater than that of the outside diameter of the hitch pin 28. Hitch pin 28 passes through the tubed keeper 29 and is further inserted into a second tubed keeper 29, located in the forward upper interior corner on side panel 22. Cover assembly 19 is raised or lowered rotating about the axis of the inserted hitch pin 28 being inserted through one tube keeper 29 into the second tubed keeper 29. Flap 34 is attached to the forward edge of the roof 20 to provide a seal to cover the open gap between the aft end of the tonneau cover 18 and the forward edge of the roof 20 to prevent dust and weather elements from entering. Cover assembly 19 can be removed from a deployed position and transferred to a stowed position by removing hitch pin 28 from the tubed keepers 29. The cover assembly 19 can now be positioned in the stowed position underneath tonneau cover 18, location of stowed cover assembly 19 shown by broken line silhouette outline. The cover assembly 19 is kept in the stowed position underneath the rearward end of the tonneau cover 18 by hanger brackets 32, (FIG. 9) and by inserting hitch pin 28 though a tubed keeper bracket 30 which is attached to the rearward underside of tonneau cover 18. Hitch pin 28 is then further inserted to pass through the tubed keeper 29 attached to the cover assembly 19, opposite the end supported by hanger brackets 32 (FIG. 9), to secure the assembly in place while disposed in the stowed position. The common aftermarket tonneau cover 18, of the type exemplified by the proceeding drawings, can be lifted by the user from the aft end, and elevated to a raised position to better facilitate access to the stowed aerodynamic truck bed extender 16.

Operation

To change the aerodynamic stowable truck bed extender 16 from a deployed configuration of FIGS. 1, 2, 3, and 4 to a stowed configuration of FIGS. 7 and 9, the user first grasps and rotates handle 31 to unfasten back panel 21 from the side panels 22 and 23. Continuing to grasp handle 31, the user then lifts upward raising the entire cover assembly 19 which rotates about hitch pins 28 (FIG. 10) and thus cover assembly 19 can be moved to a fully open position (FIGS. 5 and 6). The lower edge of back panel 21 is finally situated in slots in the upper interior edges of side panels 22 and 23 by the user to secure the cover assembly 19 in the fully open position. Cargo may now be loaded into or unloaded from the truck bed 12 with the cover assembly 19 disposed in the fully open position. To remove the cover assembly 19 from atop the side panels 22 and 23, the hitch pins 28 are extracted from being inserted into the right side and left side tubed keepers 29 (FIG. 10) and the cover assembly 19 may now be removed from atop side panels 22 and 23. The user can also now relocate the freed cover assembly 19 to a stowed position within the truck bed 12 interior (FIGS. 7 and 9). If an aerodynamic truck cap 14 is mounted upon the truck bed 12, the user raises the top cover of the aerodynamic truck cap 14 to an open position and then positions the cover assembly 19 along the front interior wall, proximate to the front panel 13, of the truck bed 12 (FIG. 7). The cover assembly 19 is securely held upright in place by latches 25 (FIG. 7). If a tonneau cover 18 is mounted on the truck bed 12, the user raises the tonneau cover 18, at the rear, to an open position and slides the end of the hinged connection between the roof 20 and back panel 21 of the cover assembly 19 into the hanger brackets 32 located on the underside of the tonneau cover 18 (FIG. 9). The opposite, now rearward end of the cover assembly 19, having the tubed keepers 29, is lined up with the tubed keeper brackets 30 (FIG. 10) and hitch pins 28 are inserted through both the tubed keepers 29 and the tubed keeper brackets 30 to secure the assembly cover 19 in the stowed position underneath the tonneau cover 18 (FIG. 9). The user may now reposition the side panels 22 and 23, from a deployed position upon the upper surface of the lowered tailgate 15, to a stowed position within the truck bed 12. Sliding latches 24, located on the insides of the side panels 22 and 23, at the lower rear corners, are first disengaged by the user from the tailgate rotary latches 33, (FIGS. 7 and 9). The side panels 22 and 23 are now independently rotated inboard and forward by the user with the side panels 22, 23 rotating about the axis of the hinge 26 which is connected to the tailgate stop pillars 27 of the truck bed side walls 17 (FIG. 8). The side panels 22 and 23 are finally situated in a stowed position, alongside the interior wall of the truck bed side walls 17 at the rearward end of the truck bed 12 (FIGS. 7 and 9). The side panels 22 and 23 are secured in a stowed position within the truck bed 12 by sliding latches 24 (FIG. 7). The user may finally close the open tailgate 15, from an open position. To return the aerodynamic stowable truck bed extender to a deployed position of FIGS. 1 and 3, the process is reversed.

What is claimed is:

1. An aerodynamic stowable truck bed extender for conventional pickup trucks having a cab, a cargo bed bounded by a front wall, opposed sides, and a tailgate, with said tailgate configured to move between a closed position and an open position, the aerodynamic stowable truck bed extender comprising:
   a pair of generally trapezoidal side panels, said side panels operationally disposed in either a stowed configuration within said cargo bed or in a deployed configuration overlying said tailgate while said tailgate is disposed in said open position;
   an aerodynamic cover operationally disposed upon said side panels in said deployed configuration or detached from said side panels and stowed within said cargo bed disposed in a stowed configuration, said cover comprising a top and a rear panel.

2. The aerodynamic stowable truck bed extender as defined in claim 1 wherein said cover is pivotally coupled to said side panels while said side panels are disposed in said deployed configuration.

3. The aerodynamic stowable truck bed extender as defined in claim 1 wherein said top of said cover is hingedly attached to said rear panel of said cover.

4. The aerodynamic stowable truck bed extender as defined in claim 1 wherein said cover is operationally disposed upon said side panels, while said side panels are disposed in said deployed configuration whereas said cover can be disposed in either a closed configuration that provides reduced aerodynamic drag or an open configuration whereas said cover is raised to a position above said side panels while said side panels are disposed in said deployed configuration.

5. The cover assembly as defined in claim 4 wherein said cover disposed in said closed configuration completely enshrouds said open tailgate and said side panels while said side panels are configured in said deployed configuration for securing contents therein.

6. The cover assembly as defined in claim 4 wherein said cover is disposed in said open configuration to facilitate access to said cargo bed.

7. The cover assembly as defined in claim 2 wherein said cover is detachably connectable to said side panels while said side panels are disposed in said deployed configuration.

8. The cover assembly as defined in claim 7 wherein said cover is detachable from said side panels so as to be relocated to a position within said cargo bed to dispose said cover in said stowed configuration.

9. The side panels as defined in claim 1 wherein said side panels while said side panels are configured in said deployed configuration are detachably connectable to said open tailgate.

10. The side panels as defined in claim 1 wherein said side panels are hingedly attached to said opposed sides of said cargo bed along by a hinged attachment vertical inside rear edges of said opposed sides proximate said tailgate.

11. The side panels as defined in claim 10 wherein said side panels are rotational about said hinged attachment and rotated inboard from a deployed configuration overlying said open tailgate to a position within the interior of said cargo bed proximate rearward interior ends of said opposed sides to a position parallel to said opposed sides thereby disposing said side panels in said stowed configuration.

12. The tailgate as defined in claim 1 wherein said tailgate of said cargo bed can be disposed in said closed position while said side panels are configured in said stowed configuration within said cargo bed.

* * * * *